Patented Feb. 9, 1943

2,310,228

UNITED STATES PATENT OFFICE 2,310,228

PROCESS FOR THE MANUFACTURE OF PHOTOGRAPHIC COLLOIDS

Béla Gáspár, Hollywood, Calif., assignor to Chromogen, Incorporated, a corporation of Nevada No Drawing. Application April 14, 1939, Serial No. 267,905. In Great Britain May 11, 1938

7 Claims. (Cl. 95—7)

The present invention relates to the manufacture of colored photographic colloids which can be used, for example, as filter layers or as silver halide emulsion layers.

A process of manufacturing such colored filter layers and silver halide emulsion layers, by finally dispersing pigments which are photographically indifferent, for example fanal lakes, metal compounds of basic tri-phenyl-methane dyes, xanthen dyes, indigo or indanthren dyes by mechanical means in the layer-forming binding agent, has already been described. Furthermore, it is known that the dispersion of the pigments by mechanical means can be effected in the presence of small quantities of wetting agents.

Now, it has been found a much simpler process of obtaining absolutely uniform, clear and transparent i. e., optically homogeneous colored photographic colloids or colloid layers if dyes which are insoluble in water and in the binding agent are made to form true aqueous solutions with the aid of hydrotropic substances and if the solutions thus obtained are then mixed with binding agents, binding agent solutions or binding agent emulsions, for example, gelatin solutions or silver halide gelatin emulsions. The hydrotropic substance must thereby be used in such quantities that they are sufficient for obtaining true solutions of the dyes which per se are insoluble.

The term "hydrotropic substance" is used in the specification and the claims to denote salts of a polar constitution which are capable of multiplying the water solubility of difficultly soluble substances, especially such organic substances. Hydrotropic substances are for example the alkali salts of alkyl or aralkyl naphthalene sulphonic acids or of benzyl sulphanilic acid or of other organic acids as enumerated by Ullman in "Enzyklopädie der technischen Chemie," 2nd edition, volume IX, page 803.

The term "insoluble dye" as employed in the specification and the claims is not to be taken as meaning only such substances as themselves posse a perceptible color, but it is meant also to embrace comparatively colorless substances that are present in the photographic layer on account of their specific behaviour with respect to light of different wave lengths. In this sense a substance that appears practically colorless, but that, for instance, absorbs ultra-violet light and accordingly is used as an ultra-violet filter, would also be regarded as a dye.

According to the new process, insoluble dyes can be introduced into the photographic layers in the same simple manner as soluble dyes to form an optically homogeneous layer. The finished layers, on the other hand, in comparison with the layers dyed with soluble dyes have the advantage that the dyes neither bleed out nor do they diffuse into adjacent layers of multilayer material.

For carrying out this process any insoluble dyes which can be made to form true aqueous solutions by means of hydrotropic agents are suitable. For example, insoluble azo dyes are especially suitable. In many cases the preparation of the dye solution can be still further simplified by using organic solvents which are miscible with water, as methyl alcohol, ethyl alcohol, acetone, di-oxane, pyridine, or di-acetine in small quantities, in addition to the hydrotropic substances.

Example 1.—0.4 gram of the red azo dye from diazotized p-nitraniline and di-methyl-α-naphthylamine are dissolved with heating in a solution of 10 ccs. of the sulphuric acid ester of the butyric ester of ricinolic acid (known as Avirol AH, made by H. Th. Boeme—"Avirol" is a registered trade-mark) in 60 ccs. of water, and the clear solution thus obtained is mixed with 40 ccs. of a 20% strength gelatin solution.

Example 2.—0.5 gram of the dye Cibacetblau B (an azo dye manufactured by the Society for Chemical Industry in Basle) are dissolved in a solution of 10 ccs. of 10% strength of the sodium salt of sulphonated castor oil (known as "Monopol Soap" manufactured by Chemische Fabrik Stockhausen & Co.—"Monopol" is a registered trade-mark) in 50 ccs. of water and the solution thus obtained is mixed with 40 ccs. 20% strength gelatin solution.

Example 3.—0.25 gram of the yellow azo dye from diazotized amino-pyrazolone and β-naphthol are dissolved in a solution of 10 ccs. "Sapamine MS" (a special basic fatty acid amide, manufactured by the Society for Chemical Industry in Basle) in 60 ccs. water and the solution thus obtained is mixed with 40 ccs. 20% strength gelatin solution. "Sapamine" is a registered trade-mark.

In the same manner the azo dye from diazotized 4-chlor-2-amino-di-phenylether and amino-hydroquinone-di-methylether can be dissolved for example by means of "Nekal BX" (a special alkylated naphthalene sulphonic acid, manufactured by the I. G. Farbenindustrie Aktiengesellschaft). "Nekal" is a registered trade-mark.

Sapamin MS mixed with alcohol may also be employed as a solvent for the water-insoluble and almost colorless 3-amino-N-ortho-tolyl-3-phthalimide.

*Example 4.*—0.25 gram of the 3-amino-N-ortho-tolyl-phthalimide, prepared from 3-nitrophthalic acid anhydride and ortho-toluidine (analogously to the preparation of 3-amino-N-phenyl-phthalimide vide Kauffmann & Beisswenger "Berichte der Deutschen Chemischen Gesellschaft" vol. 37, page 2611, by substituting ortho-toluidine for the aniline) are dissolved by heating in 30 ccs. of Sapamin MS and the resulting solution is diluted with 30 ccs. of ethyl alcohol. Any slight residue is filtered off, and the solution is mixed at a temperature of about 40° C. with 80 ccs. of a 20% aqueous gelatin solution. The clear gelatin solution is employed to prepare a layer of 0.25 sq. m. in area.

The dyed gelatin solutions prepared according to the above mentioned examples are used for the production of filter layers or light-sensitive silver halide layers.

Instead of using the gelatin containing dyed solutions directly for the preparation of dyed gelatin layers they can be first concentrated for example by distilling off in a vacuum part of the water present. The concentrated solutions can thereafter be used for coating filter layers or mixing with silver halide emulsion prior to the coating of the dyed sensitive layer.

Silver halide emulsion layers prepared according to the process described above can be sensitized in the usual manner by adding sensitizing dyes to the solution at any stage of the process.

A multilayer material for color photographic purposes can be prepared by superimposing silver halide gelatin emulsions dyed according to the invention.

The colored silver halide emulsion layers can be used for the production of dye images by destruction of the dyes at the image or non-image parts.

It will be obvious that an aqueous solution prepared from a water insoluble dye and an aqueous solution of a hydrotropic substance as defined above may be used for making a solution of a binding agent such as gelatin. It is unnecessary that such a dye be mixed with a solution of the binding agent—the binding agent may be dissolved directly in the aqueous dye solution.

What is claimed is:

1. A process for producing colored layers for photographic purposes which comprises dissolving a dye which is substantially insoluble in water in a solution comprising water and a quantity of a hydrotropic substance sufficient to form a true solution, incorporating a binding agent into said colored solution and then pouring the colored solution to form a layer.

2. A process for producing colored layers for photographic purposes which comprises dissolving a dye which is substantially insoluble in water in a solution comprising water and a quantity of a hydrotropic substance sufficient to form a true solution, incorporating a binding agent and a light-sensitive silver halide into said colored solution and then pouring the colored emulsion to form a light-sensitive layer.

3. A process for producing colored layers for photographic purposes which comprises dissolving a dye which is substantially insoluble in water in a solution comprising water and a quantity of a hydrotropic substance sufficient to form a true solution, incorporating a colloid into said colored solution and then pouring the colored solution to form a layer.

4. A process for producing colored layers for photographic purposes which comprises dissolving a dye which is substantially insoluble in water in a solution comprising water and a quantity of a hydrotropic substance sufficient to form a true solution, adding a silver halide emulsion to said colored solution and then pouring the colored emulsion to form a layer.

5. A process for producing colored layers for photographic purposes which comprises dissolving an azo dye which is substantially insoluble in water in a solution comprising water and a quantity of a hydrotropic substance sufficient to form a true solution, adding a silver halide gelatin emulsion to said colored solution and then pouring the colored emulsion to form a layer.

6. A process for producing colored layers for photographic purposes which comprises dissolving an azo dye which is substantially insoluble in water in a solution comprising water and a quantity of a hydrotropic substance sufficient to form a true solution, incorporating a silver halide gelatin emulsion and a sensitizing dye into said colored solution and then pouring the colored emulsion to form a color sensitized light-sensitive layer.

7. A process for producing colored layers for photographic purposes which comprises dissolving a dye which is substantially insoluble in water in a solution comprising water and a quantity of a hydrotropic substance sufficient to form a true solution, incorporating a binding agent into said colored solution, removing a part of the water from the colored solution and forming a photographic layer from said remaining solution.

BÉLA GÁSPÁR.